J. WEIGEL.
POULTRY FEEDER.
APPLICATION FILED FEB. 15, 1913.
1,098,603.
Patented June 2, 1914.
4 SHEETS—SHEET 1.
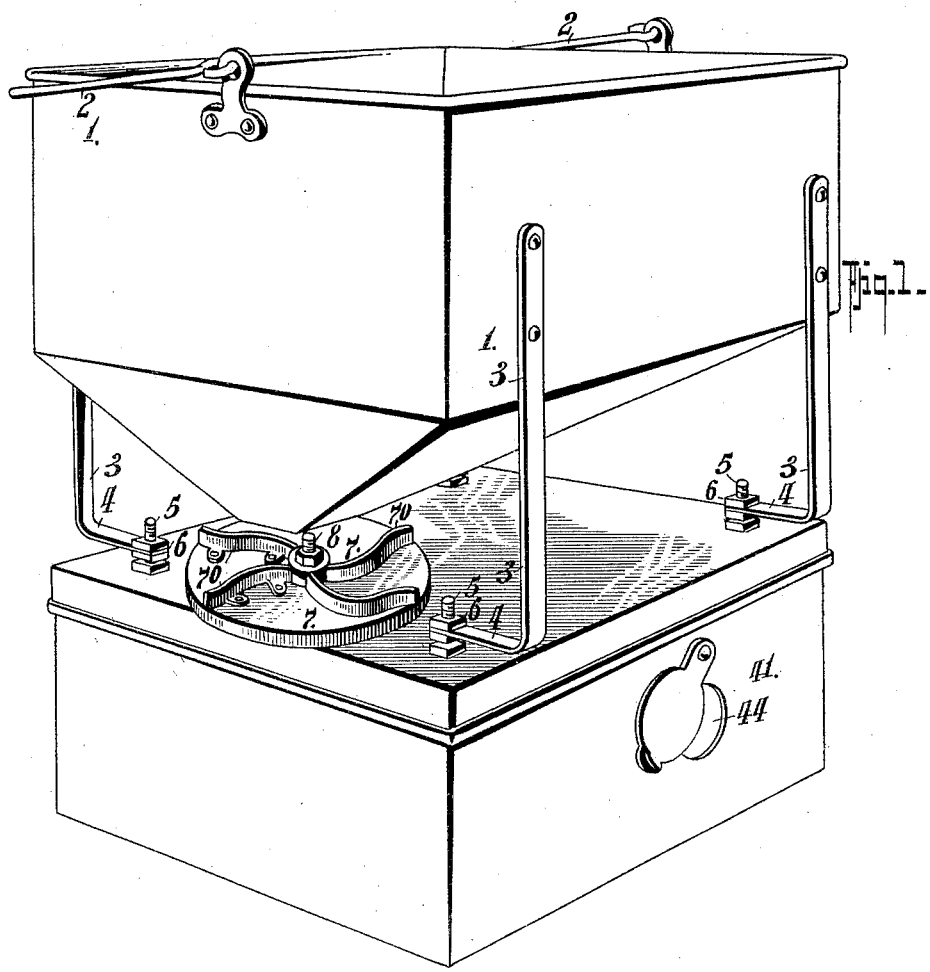
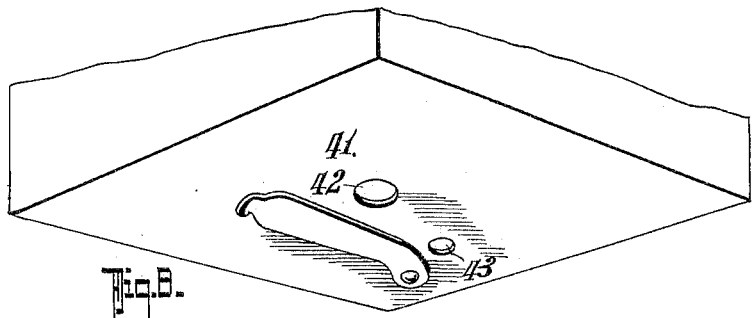
WITNESSES:
H. Woodard
Robert Grunwell
INVENTOR
Joseph Weigel
BY
Fred G. Dieterich
ATTORNEYS

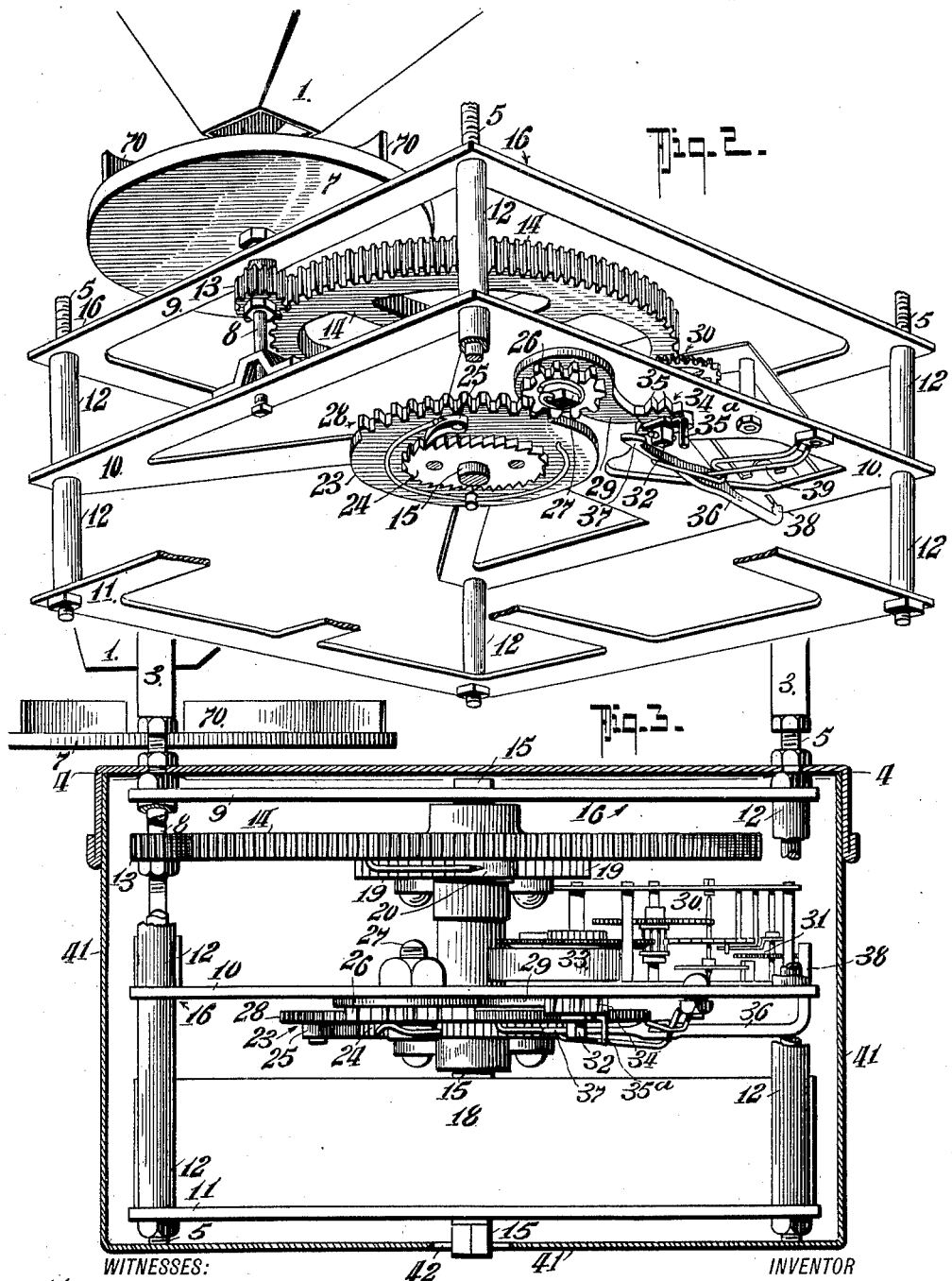

J. WEIGEL.
POULTRY FEEDER.
APPLICATION FILED FEB. 15, 1913.

1,098,603.

Patented June 2, 1914.

4 SHEETS—SHEET 3.

WITNESSES
H. Woodard
Robert Grunwell

INVENTOR
Joseph Weigel
BY
Fred G. Dieterich
ATTORNEYS

J. WEIGEL.
POULTRY FEEDER.
APPLICATION FILED FEB. 15, 1913.
1,098,603.
Patented June 2, 1914.
4 SHEETS—SHEET 4.
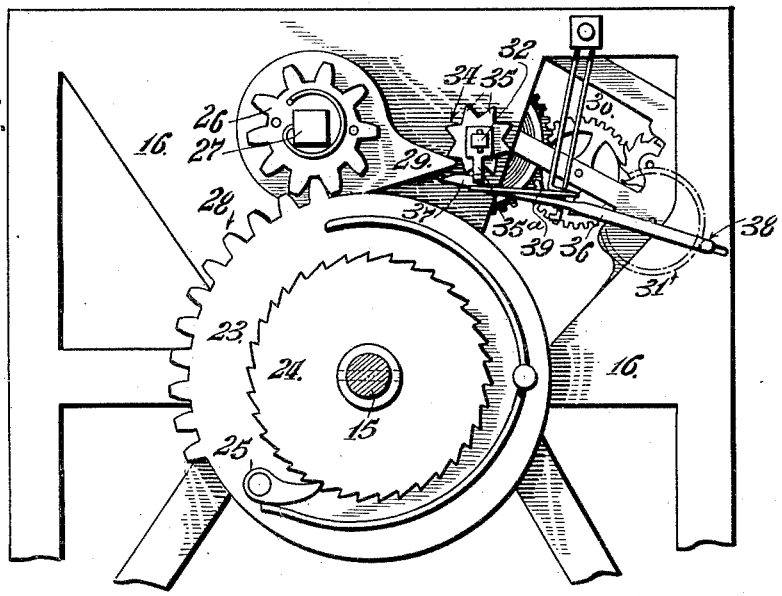
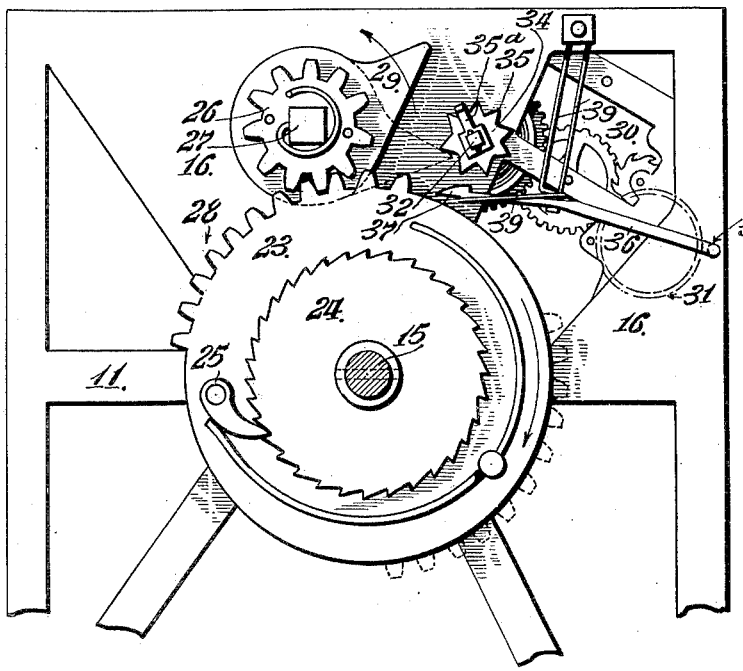
WITNESSES:
H. Woodard
Robert Greenwell
INVENTOR
Joseph Weigel
BY
Fred G. Dieterich
ATTORNEYS

UNITED STATES PATENT OFFICE.

JOSEPH WEIGEL, OF FLANDREAU, SOUTH DAKOTA.

POULTRY-FEEDER.

1,098,603.　　　　Specification of Letters Patent.　　Patented June 2, 1914.

Application filed February 15, 1913. Serial No. 748,629.

*To all whom it may concern:*

Be it known that I, JOSEPH WEIGEL, residing at Flandreau, in the county of Moody and State of South Dakota, have invented a new and Improved Poultry-Feeder, of which the following is a specification.

My invention contemplates certain improvements in that class of poultry feeding mechanism that include timing devices for setting in operation the feeding means and in which the feeding operations are intermittently effected.

Primarily, my invention has for its purpose to provide a poultry feeding means of the general character stated, of a simple and inexpensive construction, in which the several parts are compactly arranged and coöperatively so combined that they can be conveniently adjusted for effecting the desired number of feed distributing operations, and which, after having effected the said desired number of seed discharges or distributions, automatically cuts out the further operation of distributing the feed.

With other objects in view that will hereinafter appear, my invention embodies, among other elements, an improved brake device for checking the operation of the feeding mechanism at predetermined times and a removable and adjustably mountable controlling means that is especially designed for coöperating with the grain distributing or feeding means that it may be conveniently set with respect to the said distributing means and the brake device to provide for either a single, two, three or more independent or intermittent operations of the grain feeding means.

In its more subordinate features, my invention consists in certain details of construction and novel arrangement of the parts hereinafter fully described, specifically pointed out in the appended claims and illustrated in the accompanying drawings, in which—

Figure 4:
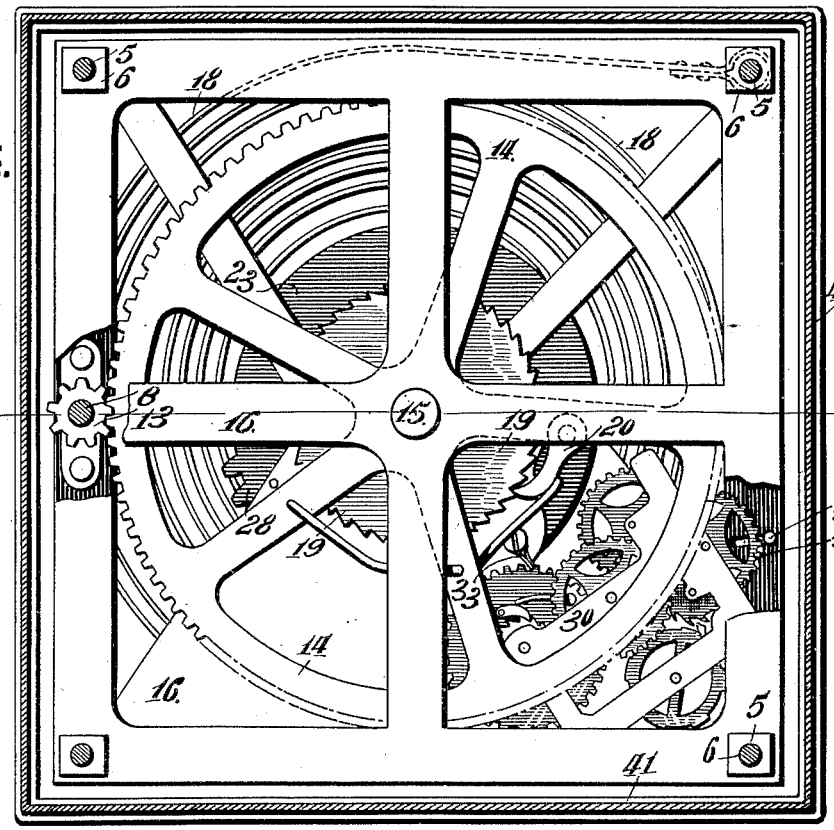
Figure 5:
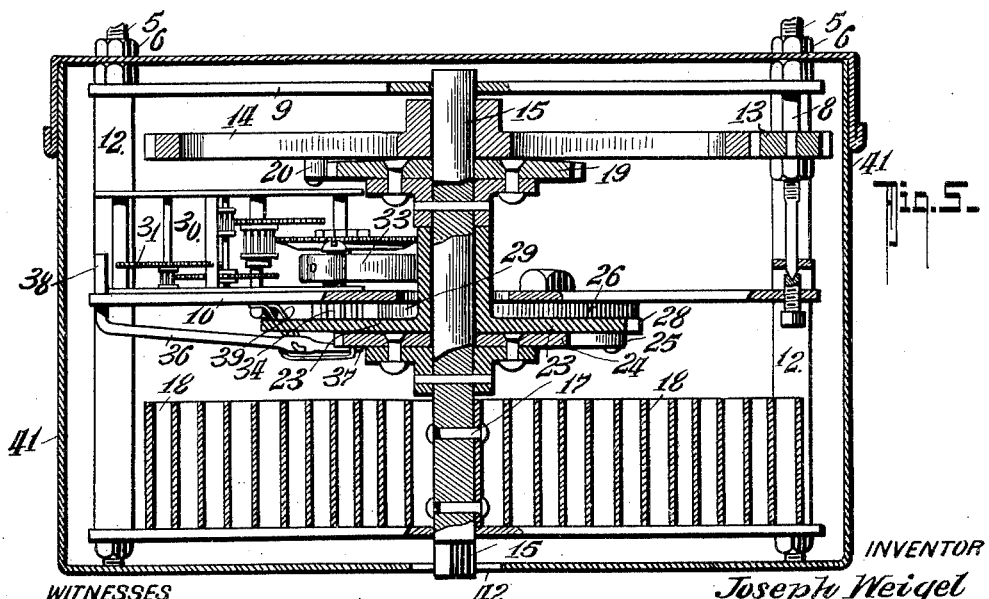

Figure 1 is a perspective view of my invention and illustrates the general external arrangement thereof. Fig. 2 is a perspective view of the internal parts, and illustrates more particularly the controlling means and the brake devices that coöperate therewith, the outer casing being omitted. Fig. 3 is a side elevation of the mechanism shown in Fig. 2, the casing being shown in section. Fig. 4 is a horizontal section thereof, taken on the line 4—4 on Fig. 3. Fig. 5 is a vertical longitudinal section of the same on the line 5—5 on Fig. 4. Fig. 6 is a plan view, the parts being at a position they assume when the "star" wheel has been tripped, and the devices are at a position for operating the feed distributing means. Fig. 7, is a plan view of the controlling mechanism that regulates the number of successive operations of the seed throwing or distributing means, the parts being at a position they assume when the "star" wheel has set the brake devices for stopping further operation of the feed distributing means. Fig. 8 is a detail perspective view of the bottom of the casing.

In the practical application of my invention, the same is arranged for being suspended in the poultry house or barn from an over-head support, and for such purpose the feed hopper 1 is provided with a bail 2 for hanging the feeder from the support, the said bail also acting as a handle when it is desired to carry the feeder from place to place.

Hanger bars 3—3 are secured to the opposite sides of the hopper 1 and they have inturned apertured members 4 that fit over the threaded ends of the long bolts 5 that form the end stays of the framing 16 upon which the operating mechanism, presently explained, is supported, and the said mechanism is held on the said members 3 by the clamp nuts 6 that engage the screw bolts 5, as shown.

The hopper 1 has its discharge near its front end and so arranged that it drops the grain onto a rotary distributer that consists of a horizontal disk 7 whose upper face has a series of radially arranged flanges or wings 70, and these are so curved that they throw off the seed under a centrifugal action, as it drops onto the disk 7 from the hopper 1 and thereby distribute the seed to all parts of the room or barn in which my feeding mechanism may be suspended.

The disk 7 is fixedly mounted upon the upper end of a driven shaft 8, that is vertically disposed on the front end of a frame 16, that includes an upper, lower and an intermediate section, designated 9, 10 and 11, respectively, the ends of which engage the bolts 5 and are held apart by the spacing sleeves 12 on the said bolts.

The shaft 8 carries a pinion 13 that meshes with a master or driving gear 14 loosely mounted on the power shaft 15 centrally supported on the framing 16, and to which is connected one end 17 of the main or power spring 18, the other end of which is secured to the frame 16, as shown.

19 designates a ratchet disk that is fixedly mounted on the shaft 15 and it coöperates with a pawl 20 on the underside of the gear 14, it being understood that so soon as the spring power is loosened up, or set free, the shaft 15, through its disk 19, imparts rotary motion to the distributer disk 7, through gears 14 and 13.

23 designates a mutilated gear also loosely mounted on the shaft 15 at a point below the intermediate frame 11, and it carries a pawl 25 that coacts with a ratchet disk 24 fixedly held on the shaft 14, see Fig. 2.

26 is a stop gear mounted on a stub shaft 27, and the said gear, at predetermined times, is engaged by the segment 28 of the gear 23. Stop gear 26 includes a laterally extended finger 29, the purpose of which will presently appear.

30 designates an ordinary clock spring mechanism that is mounted upon the framing 16, one of its gears 31, acting as a brake member for engaging with a brake finger 36, that coacts with the gear 31 in the manner to be described and best shown in Figs. 3 and 4 of the drawings.

32 is the winding post or shaft for the clock spring 33 and 34 designates, what I term, a controlling or regulating wheel, since it regulates the number of feeding operations effected by the main or power spring actuated mechanism at each time the latter is set into an operative condition, to set in motion the rotary distributer 7. The wheel 34 is in the nature of a "star" wheel, it, in the present showing, having eight points or ratchets 35, the said number indicating the possible number of successive distributing operations of the disk 7.

Wheel 34 is so disposed with respect to the stop gear 28 that the stop finger 29 after each revolution of the master gear and the mutilated gear 23 comes into contact with the said wheel and by reason thereof stops further movement of the power shaft 15, the gear 14 and the movement of the grain distributer 7 until the time mechanism has caused the "star" wheel to rotate a sufficient distance (one notch) to permit the finger 29 to free itself from the said wheel and to thereby allow the main spring to again turn shaft 15, gear 14 and the rotary distributer.

It should be stated that since the master gear 14 is loosely mounted on the shaft 15 and thus impelled by the ratchet and pawl devices 19—20, the said gear will rotate after it has been started, some time after the shaft 15 stops without danger of stripping the teeth 13—14.

By referring now more particularly to Figs. 2, 6 and 7, the construction and the manner in which the brake devices for stopping the clock mechanism and holding the main spring actuated mechanism from action will be readily understood. When the parts are held at their inoperative position, the position of the stop finger 29 on the gear 26, the mutilated gear 23 and the brake member 36 are positioned as shown in Fig. 7.

It should be stated that the "star" wheel has a pendent member 35ª that acts like a crank pin and this member is arranged as the "star" wheel revolves to engage the hook end 37 of the brake member 35 and shift the said member to bring its brake head 38 into contact with the brake wheel of the clock mechanism at which position the brake lever is held until it is hand released at such time when it is desired to set the feeding mechanism into action.

39 designates a spring that engages the brake member and serves to hold it over against the crank pin after the latter has engaged and shifted the brake device to its braking position.

In the drawings, I have shown the "star" wheel so set that the pin or pendent member 35ª does not come into play to shift the brake device to stop the clock mechanism until the said wheel 34 has moved to its maximum extent, the distance of eight notches or points, thereby providing for eight distinct operations of the distributing devices when the clockwork is released, which is done by pulling back the brake member until its hook end disengages the "star" pin or member 36. By setting the "star" wheel relatively to the brake device say,—at right angles to the said devices, the "star" wheel when arranged as shown would move but six points before applying the brake, thus providing for six operations of distributing the seed, it being also apparent that the "star" wheel may be readily adjusted to provide a lesser number of distributing operations down to a single action of the rotary distributer.

The entire gear mechanism is inclosed within a casing 41 apertured at 42 and 43 for the insertion of winding keys for storing up the main or power spring and the clock spring and a curved opening 44 for access to the brake device, the tripping of which frees the clock mechanism which in turn moves the "star" wheel and which at predetermined times releases the stop finger 29 and thereby sets in action the main or power mechanism.

By my construction, it will be observed that at each impulse of the starting motor, the distributing plate or wheel 7 will be "spun," that is,—it will be given a rotative impulse that will last an indefinite time after the motor has stopped operating. This is made possible by virtue of the pawl and ratchet connection 19—20.

The arrangement of the parts as herein described and as shown in the drawings is a preferred construction, but I do not limit myself to the exact details shown and described, since they may be readily modified or varied without departing from my invention and the scope of the appended claims.

What I claim is:

1. In an automatic feeding device, a rotatable feed distributing member, a driving motor for said member, gear connections between said motor and said distributing member, said connections including means for spinning said distributing member as said motor operates, combined with a clockworks controlling device for intermittently setting said motor into operation, said controlling device including controlling connections with the motor.

2. In an automatic feeding device of the character stated, a rotatable feed distributing member, a motor for operating said distributing member, a controlling device for said motor for stopping and starting said motor intermittently, and a driving connection between said motor and said distributing member for imparting a spinning motion to said distributing member whereby said distributing member will continue turning for an indefinite period after said motor has been stopped.

3. In an automatic feeding device of the character stated, a rotatable feed distributing member, a motor for operating said distributing member, a controlling device for said motor for stopping and starting said motor intermittently, and a driving connection between said motor and said distributing member for imparting a spinning motion to said distributing member whereby said distributing member will continue turning for an indefinite period after said motor has been stopped, and a clockworks mechanism coöperating with said controlling device for actuating the same.

4. In an automatic feeding device of the character stated, a rotatable feed distributing member, a motor for operating said distributing member, a controlling device for said motor for stopping and starting said motor intermittently, and a driving connection between said motor and said distributing member for imparting a spinning motion to said distributing member whereby said distributing member will continue turning for an indefinite period after said motor has been stopped, a clockworks mechanism coöperating with said controlling device for actuating the same, and a brake device coöperative with said clockworks mechanism, and a part of said controlling device whereby, when said controlling device has operated for a predetermined time, said clockworks mechanism will be stopped.

5. In an automatic feeding device of the character stated, a feed distributing member, a motor, gearing for spinning the said member operatively connected with the said motor, means coöperating with the said gearing for intermittently stopping and releasing the motor and the gearing, said means including a controlling device, a clock mechanism for actuating the said controlling device, the said device operating to intermittently check and release the motor controlled gearing, means for stopping the clock mechanism actuated by the controlling device at predetermined times, said means comprising a brake member shiftable by the controlling device and arranged to interlock with the clock mechanism when shifted by the controlling device.

6. In an automatic feeding device of the character stated, a feed distributing member, a motor, gearing for spinning the said member operatively connected with the said motor, means coöperating with the said gearing for intermittently stopping and releasing the motor and the gearing, said means including a controlling device, a clock mechanism for actuating the said controlling device, the said device operating to intermittently check and release the motor controlled gearing, means for stopping the clock mechanism actuated by the controlling device at predetermined times, said means comprising a brake member shiftable by the controlling device and arranged to interlock with the clock mechanism when shifted by the controlling device, the said brake device being spring held to its operative position and adapted for being released from the controlling device by hand.

7. In an automatic feeding device of the character stated, a feed supply, a feed distributing member located below the feed supply, means for pivotally mounting said member on a vertical axis for free rotation in one direction, a step-by-step actuated motor mechanism for imparting a spinning motion to said distributing member at each step of operation of the motor mechanism, and means for controlling the stopping and starting of the motor mechanism.

8. In an automatic feeding device of the character stated, a feed supply, a feed distributing member located below the feed supply, motor mechanism for positively rotating the said distributing member, a timed stopping mechanism for holding the motor mechanism under tension and moved to a motor releasing position at predetermined times, the said motor mechanism including a loosely mounted master gear, and a clutch and ratchet device for impelling the master gear when the motor mechanism is released and put into action.

9. In an automatic feeding device of the character stated, a feed supply, a feed distributing member, a motor mechanism for rotating the said member, a controlling means for intermittently stopping the motor mechanism, the said controlling means including a rotatable member having radial projections, a rotatable stop finger that forms a part of the motor mechanism and which intermittently and successively engages the radial projections of the rotatable member, and a clock mechanism for actuating the said rotatable member.

10. In an automatic feeding device of the character stated, a feed supply, a feed distributing member, a motor mechanism for rotating the said member, a controlling means for intermittently stopping the motor mechanism, the said controlling means including a rotatable member having radial projections, a rotatable stop finger that forms a part of the motor mechanism and which intermittently and successively engages the radial projections of the rotatable member, a clock mechanism for actuating the said rotatable member, and a brake device for stopping the clock mechanism that is arranged to be shifted by the rotatable controlling member at predetermined times.

11. In an automatic feeding device of the character stated, a feed supply, a feed distributing member, a motor mechanism for rotating the said member, a controlling means for intermittently stopping the motor mechanism, the said controlling means including a rotatable member having radial projections, a rotatable stop finger that forms a part of the motor mechanism and which intermittently and successively engages the radial projections of the rotatable member, a clock mechanism for actuating the said rotatable member, a brake device for stopping the clock mechanism that is arranged to be shifted by the rotatable controlling member at predetermined times, the said controlling member including a pendent pin and the brake device having a hooked end with which the pin engages.

12. In an automatic feeding device of the character stated, a feed supply, a feed distributing member, a motor mechanism for rotating the said member, a controlling means for intermittently stopping the motor mechanism, the said controlling means including a rotatable member having radial projections, a rotatable stop finger that forms a part of the motor mechanism and which intermittently and successively engages the radial projections on the rotatable member, a clock mechanism for actuating the said rotatable member, a brake device for stopping the clock mechanism that is arranged to be shifted by the rotatable controlling member at predetermined times, the said controlling member including a pendent pin and the brake device, having a hooked end with which the pin engages, the said controlling member being adjustably mounted whereby to set the pin relatively close up or away from the hooked end of the brake device to control the number of the feed distributing operations.

13. In an automatic feeding device of the character stated, a feed distributing member, a motor mechanism, means for rotating the same, said mechanism including a mutilated gear, a stop gear that meshes with the mutilated gear, the said stop gear having a laterally extended finger, a clock mechanism controlled stop wheel, the said stop wheel having radial notches for coöperating with the stop finger of the stop gear, and means controlled by the clock mechanism actuated stop wheel for automatically stopping the said clock mechanism and thereby stop the several actuating mechanisms.

14. In a poultry feeder, a distributing plate rotatable in a horizontal plane, a motor for imparting rotation to said plate, means for intermittently stopping and starting said motor, gear connections between said motor and said plate which include a loosely mounted master gear, a driving shaft, and a pawl and ratchet connection between said shaft and gear whereby at each impulse of the motor the distributer or disk will be spun during a greater interval of time than the time of action of the motor, and mechanism for controlling the intermittent stopping and starting means.

15. In a poultry feeder, a distributing plate rotatable in a horizontal plane, a motor for imparting rotation to said plate, means for intermittently stopping and starting said motor, gear connections between said motor and said plate which include a loosely mounted master gear, a driving shaft, and a pawl and ratchet connection between said shaft and gear whereby at each impulse of the motor the distributer or disk will be spun during a greater interval of time than the time of action of the motor, mechanism for controlling the intermittent stopping and starting means, said controlling mechanism including a clockworks coöperatively connected with said intermittent stopping and starting means and mechanism for stopping the action of said clockworks after the motor mechanism has been stopped and started a predetermined number of times to thereby render the entire apparatus inoperative.

JOSEPH WEIGEL.

Witnesses:
WARREN G. COWLES,
J. R. COONROD.